Figure 1:
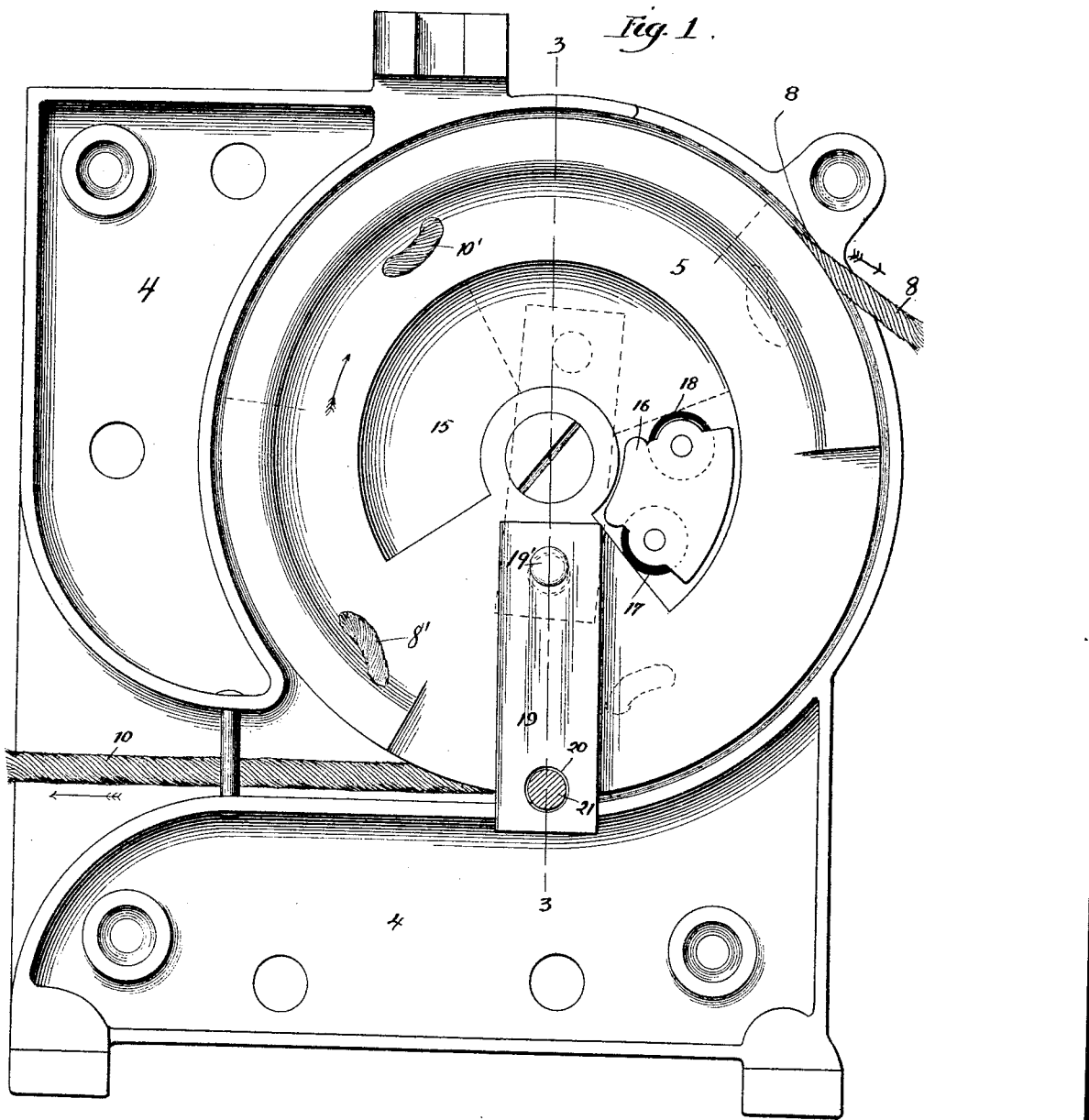

(No Model.)

J. W. MEAKER.
OPERATING DEVICE FOR FARE REGISTERS.

No. 480,732. Patented Aug. 16, 1892.

Witnesses:
Julia M. Bristol.
Ralph Vandyke.

Inventor:
John W. Meaker,
by Bond Adams & Pickard
Attorneys (No Model.) 2 Sheets—Sheet 2.
J. W. MEAKER.
OPERATING DEVICE FOR FARE REGISTERS.
No. 480,732. Patented Aug. 16, 1892.
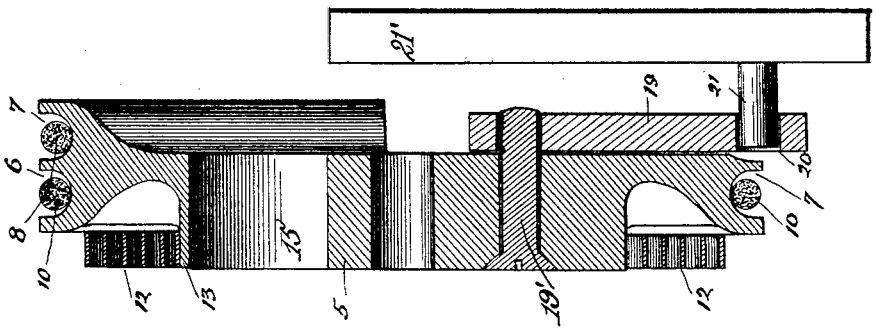
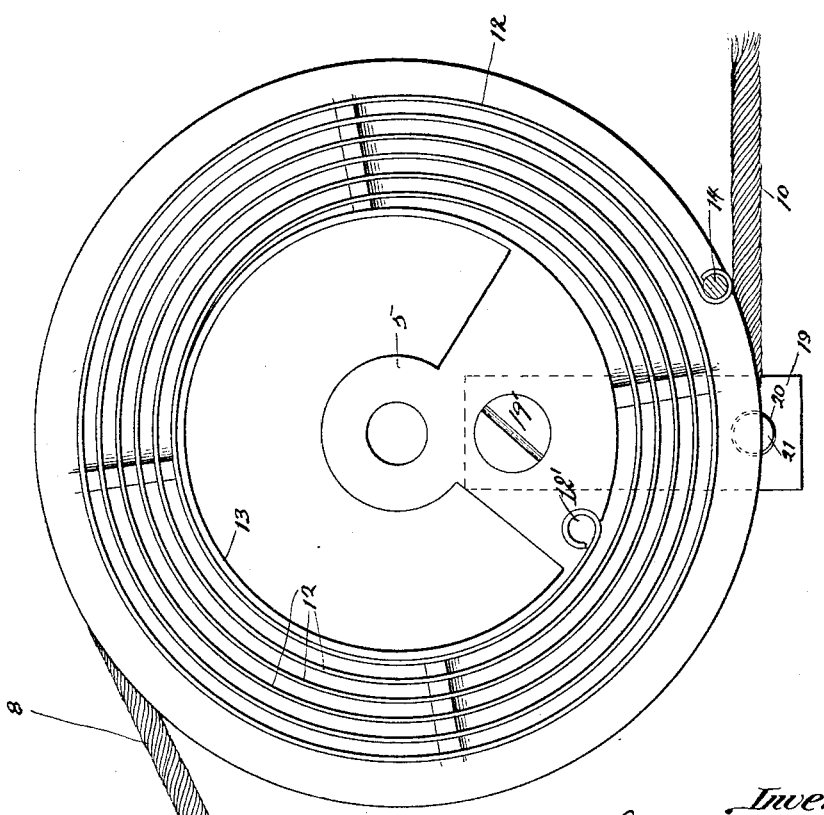
Witnesses:
Julia M. Bristol
Ralph Vandyke
Inventor:
John W. Meaker,
by Bond, Adams & Pickard
Attorneys

UNITED STATES PATENT OFFICE.

JOHN W. MEAKER, OF CHICAGO, ILLINOIS, ASSIGNOR TO THE MEAKER MANUFACTURING COMPANY, OF SAME PLACE.

OPERATING DEVICE FOR FARE-REGISTERS.

SPECIFICATION forming part of Letters Patent No. 480,732, dated August 16, 1892.

Application filed May 2, 1892. Serial No. 431,601. (No model.)

*To all whom it may concern:*

Be it known that I, JOHN W. MEAKER, a citizen of the United States, residing at Chicago, in the county of Cook and State of Illinois, have invented certain new and useful Improvements in Operating Devices for Fare-Registers, of which the following is a specification, reference being had to the accompanying drawings, in which—

Figure 1 is a front elevation, the device being detached from the register. Fig. 2 is a rear elevation of the wheel, showing means for mounting the spring; and Fig. 3 is a vertical cross-section on line 3 3, Fig. 1.

My invention relates to devices for operating the main pull-bar of stationary fare-registers, and is particularly adapted to be used in connection with the stationary register described in my patent, No. 454,370, dated June 16, 1891.

The object of my invention is to provide a new and improved device for operating the main pull-bar of a stationary register. I accomplish this object as illustrated in the drawings and as hereinafter specified.

That which I regard as new will be set forth in the claims.

In the drawings, 4 indicates the attaching-plate of a register, which is adapted to be attached to the register at the rear and to be attached to the wall of the car in the usual manner.

5 indicates a wheel, which is pivotally mounted upon the plate 4, as best shown in Fig. 1. The upper portion of the periphery of the wheel 5 is broader than the lower portion of its periphery and is provided with two grooves 6 7. The groove 6 is adapted to receive a cord 8, which extends around the periphery of the wheel and is secured to the wheel on its under side, as best shown at 8′ in Fig. 1. The cord 8 extends tangentially from the groove 6 near the upper side of the wheel 5, as best shown in Fig. 1, and extends along the car in such a position as to be conveniently accessible to the conductor. The arrangement is such that by pulling the cord in the direction indicated by the arrow in Fig. 1 the wheel 5 will be moved in the direction indicated by the arrow in Fig. 1.

The groove 7 extends around the periphery of the wheel 5 to the under side of the wheel, as best shown in Fig. 3, and receives a cord 10, which is secured to the upper side of the wheel 5, as shown at 10′ in Fig. 1, and extends tangentially from the under side of the wheel 5 about in the opposite direction to that in which the cord 8 extends, as shown in Fig. 1. The arrangement is such that by pulling the cord 10 in the direction indicated by the arrow in Fig. 1 the wheel 5 may be rotated in the direction indicated by the arrow in Fig. 1. The cord 10 also extends along the car within easy reach of the conductor, the cords 8 and 10 being on opposite sides of the car.

12 indicates a coiled spring, which is wound around a hub 13, formed upon the wheel 5, one of its ends being secured to the hub 13, as at 12′, and its other end being secured to a pin or other suitable device 14, attached to the plate 4, as best shown in Fig. 2. The spring 12 is so arranged that when the wheel 5 is rotated in the direction indicated by the arrow in Fig. 1 the tension of the spring will act to return the wheel 5 to the position shown in Fig. 1, which is its normal position.

15 indicates a circular slot, which is formed in the hub 13 of the wheel 5, as best shown in Fig. 1, which slot extends through an arc of about two hundred and seventy degrees.

16 indicates a stop, which is rigidly attached to the plate 4 and projects therefrom into the slot 15 near one end of said slot.

17 and 18 indicate rubber cushions or bumpers, which are secured to the stop 16 in such position as to be struck by the portion of the hub at the ends of the slot 15 when the wheel 5 is operated or is returned to its normal position, thereby serving to reduce the shock. The position of the stop 16 is best shown in Fig. 1.

19 indicates a link, which is eccentrically pivoted at one end to the wheel 5 through the medium of a pivot-pin 19′, as best shown in Figs. 1 and 3, and is provided with a recess or hole 20 near its lower end, adapted to receive a pin 21, that projects from the main pull-bar, as at 21′, of the register, substantially as described in my former patent hereinbefore referred to.

The length of the link 19 and the position of the recess 20 are so fixed that when the link is in its lowermost position, as shown in Fig. 1, the main pull-bar of the register will also be in its normal position. When the wheel 5 is rotated by operating either one of the cords 8 and 10, the link 19 will be moved upward to the position indicated by dotted lines in Fig. 1, thereby pulling upward the pin 21 and the pull-bar to which it is connected and operating the register.

The link 19 is eccentrically pivoted to the wheel 5, so that such link will be operated by the rotation of the wheel. As the link 19 is connected with the pull-bar 21', it will be obvious that when the wheel is turned the lower end of the link will move upward in a vertical line for the reason that it is secured to the pull-bar of the register, and is thereby held in a straight line.

The link 19 is so pivoted upon the wheel 5 and the stop so arranged that when the wheel reaches the limit of its rotation the pivot of the link will have passed over the pivot of the wheel and preferably across a vertical line drawn through the wheel-pivot. The pull-bar of the register will therefore have been moved to its highest point before the wheel 5 stops, and after it reaches its highest point it will move down again slightly. The rapidity of the upward motion of the pull-bar will also gradually diminish as it approaches its highest point, as the pivot of the link moves in the arc of a circle, and its upward movement gradually decreases as it nears its highest point. By this construction the danger of injuring the registering mechanism is avoided, for no matter how violently the device is operated the gradual diminution of the speed of the pull-bar prevents it from coming to a sudden stop, and thereby prevents jarring and consequent wear of the parts. This construction also makes it impossible to move the register-chains more than a single space at each operation of the pull-bar, as after the pull-bar reaches its highest point it cannot be forced higher, but must begin to descend.

I do not wish to limit myself to any particular form of wheel, as any suitable form may be used, or a crank-arm of suitable construction may be used instead, as it would be the full equivalent of the wheel.

Although my improved operating device is especially adapted for use with the register hereinbefore referred to, it may be easily adapted for use with registers of various kinds, and I do not wish to limit myself to its use with any particular register or to any particular link or equivalent device for connecting it with the pull-bar of the register, as the construction of such connecting device would depend in a measure upon the construction of the register.

That which I claim as my invention, and desire to secure by Letters Patent, is—

1. The combination, with the pull-bar of a register, of a wheel, means for rotating said wheel, devices eccentrically connecting said wheel to said pull-bar, whereby the pull-bar may be reciprocated by rotating said wheel, and devices for returning the wheel to its normal position, substantially as described.

2. The combination, with the pull-bar of a register, of a wheel, a link connected to said pull-bar and eccentrically pivoted to said wheel in such position that its pivot will be over and in line with the pivot of the wheel when the pull-bar is at its highest position, and devices for operating said wheel, substantially as described.

3. The combination, with the wheel 5 and devices for rotating said wheel, of the pull-bar of a register, a stop adapted to limit the rotation of said wheel, and devices eccentrically connecting said wheel to the pull-bar of the register, substantially as described.

JOHN W. MEAKER.

Witnesses:
JOHN L. JACKSON,
A. H. ADAMS.